United States Patent [19]

Imai et al.

[11] Patent Number: 5,032,926

[45] Date of Patent: Jul. 16, 1991

[54] VIDEO TAPE RECORDER HAVING PICTURE-IN-PICTURE FUNCTION

[75] Inventors: Toshiaki Imai, Chiba; Tsutomu Yamashita, Saitama; Hiroshi Kuwabara, Kanagawa, all of Japan

[73] Assignee: Sony Corporation, Tokyo, Japan

[21] Appl. No.: 339,812

[22] Filed: Apr. 18, 1989

[30] Foreign Application Priority Data

Apr. 28, 1988 [JP] Japan .................................. 63-106543

[51] Int. Cl.⁵ .............................................. H04N 5/76
[52] U.S. Cl. ...................................... 358/335; 360/15
[58] Field of Search ............... 358/335, 310, 183, 181, 358/22; 360/33.1, 19.1, 15

[56] References Cited

U.S. PATENT DOCUMENTS 4,725,888  2/1988  Hakamada ......................... 358/183

FOREIGN PATENT DOCUMENTS 0048769  5/1981  Japan .................................. 358/183

OTHER PUBLICATIONS

Gordon McComb, Video Magic, Sep. 1987, pp. 71-74, Popular Science.

Primary Examiner—Roy N. Envall, Jr.
Assistant Examiner—Huy Nguyen
Attorney, Agent, or Firm—Alvin Sinderbrand; William S. Frommer

[57] ABSTRACT

A video tape recorder is associated with a monitor to provide sub-picture images at portions of the monitor screen for use in editing a recorded tape by inserting an input video signal. First and second memories are provided with respective capacities sufficient to store a field or frame of a video signal reproduced from the tape or of an input video signal, and writing and reading of the memories are controlled to provide sub-picture signals for display at the respective portions of the monitor screen. When playback or playback-pause modes are selected, one of the sub-picture screen portions displays the reproduced video signal as a moving picture or as a still picture, respectively. Upon change-over to the recording-pause mode, one of the sub-picture screen portions continues to display a still picture of the reproduced video signal at the moment of selection of the playback-pause mode and which may be the selected edit-in point, and the other sub-picture screen portions displays the input video signal as a moving picture so as to facilitate determining the point at which change-over to the recording mode is effected for recording the input video signal in place of the video signal previously recorded on the tape.

6 Claims, 3 Drawing Sheets

VIDEO TAPE RECORDER HAVING PICTURE-IN-PICTURE FUNCTION

BACKGROUND OF THE INVENTION

1. Field of the Invention

This invention relates generally to a video tape recorder (VTR) and, more particularly, is directed to a home video tape recorder having a so-called picture-in-picture function for simultaneously displaying, on an associated monitor, both video signals being reproduced by the VTR and video signals from another source.

2. Description of the Prior Art

When home video tapes are to be edited on home video tape recorders, two video tape recorders (VTRs) are required, with a first VTR set in its recording mode, and a second VTR set in its playback mode to provide the video signal to be inserted on the tape undergoing recording in the first VTR. When two home video tape recorders are utilized as set out above for editing home video tapes, it is difficult to identify the video signal being transmitted between the two VTRs. Further, the picture which is being recorded, cannot be readily checked until after the recorded video tape is rewound and then played back. Thus, the editing operation is complicated. Further, two television monitor receivers have to be provided in order to permit the edit-in point to be ascertained. For these reasons, the editing of video tape is hardly ever performed at home or by means of consumer-type VTRs.

OBJECTS AND SUMMARY OF THE INVENTION

Accordingly, it is an object of the present invention to provide an improved video tape recorder which avoids the above-mentioned disadvantages of the prior art.

Another object of the present invention is to provide a video tape recorder in which editing can be visually confirmed and made easy.

A further object of the present invention is to provide a home video tape recorder which can be conveniently and effectively employed for editing purposes.

In accordance with an aspect of the present invention, a video tape recorder capable of producing sub-picture signals of video signals to be edited, comprises means for reproducing video signals recorded on a tape;

means for recording video signals on the tape;

video signal input means for receiving input video signals and supplying the latter to the recording means;

switch means for selecting video signals from the reproducing means and from the video signal input means, respectively;

analog-to-digital converter means for converting the video signals selected by the switch means into digital video signals;

first and second memory means each capable of storing a field or frame of the digital video signals;

digital-to-analog converter means for converting signals read from each of the first and second memory means to analog video signals;

monitor means having a screen;

address control means for controlling writing and reading addresses of the memory means so as to read from the latter sub-picture signals which are to be supplied to the monitor means for display on the screen;

key means actuable for establishing an editing mode of the video tape recorder and for selecting an operation mode of the video tape recorder from among playback, playback-pause, recording and recording-pause modes thereof; and system control means for controlling the reproducing means, recording means, switch means and address control means, said system control means being programmed as follows:

With the video tape recorder in said editing mode, a) When the key means is actuated to select one of the playback and playback-pause modes, the switch means selects video signals from the video signal reproducing means, and the address control means causes reproduced video signals from the tape to be written in the first memory means and then read from the first memory means as sub-picture signals which correspond to the reproduced video signals;

b) When the key means is actuated to select the recording-pause mode, the switch means selects the video signals from the video signal input means, and the address control means causes the video signals from the video signal input means to be written in the second memory means and then read from the second memory means as sub-picture signals which correspond to said video signals from said input means; and c) when the key means is actuated to select the recording mode, the switch means selects the video signals from the video signal input means, and the address control means causes the video signals from the video signal input means to be written alternately in the first and second memory means and then causes reading from said first and second memory means so that sub-picture signals corresponding to the video signals from the input means are obtained from the first and second memory means, respectively.

The above, and other objects, features and advantages of the present invention, will become apparent from the following detailed description of an illustrative embodiment which is to be read in conjunction with the accompanying drawings, wherein like reference numerals identify the same or similar elements.

DESCRIPTION OF THE PREFERRED EMBODIMENT

A video tape recorder (VTR) 1 having a picture-in-picture function according to an embodiment of the present invention will now be described in detail with reference to FIG. 1 of the drawings.

Figure 1:
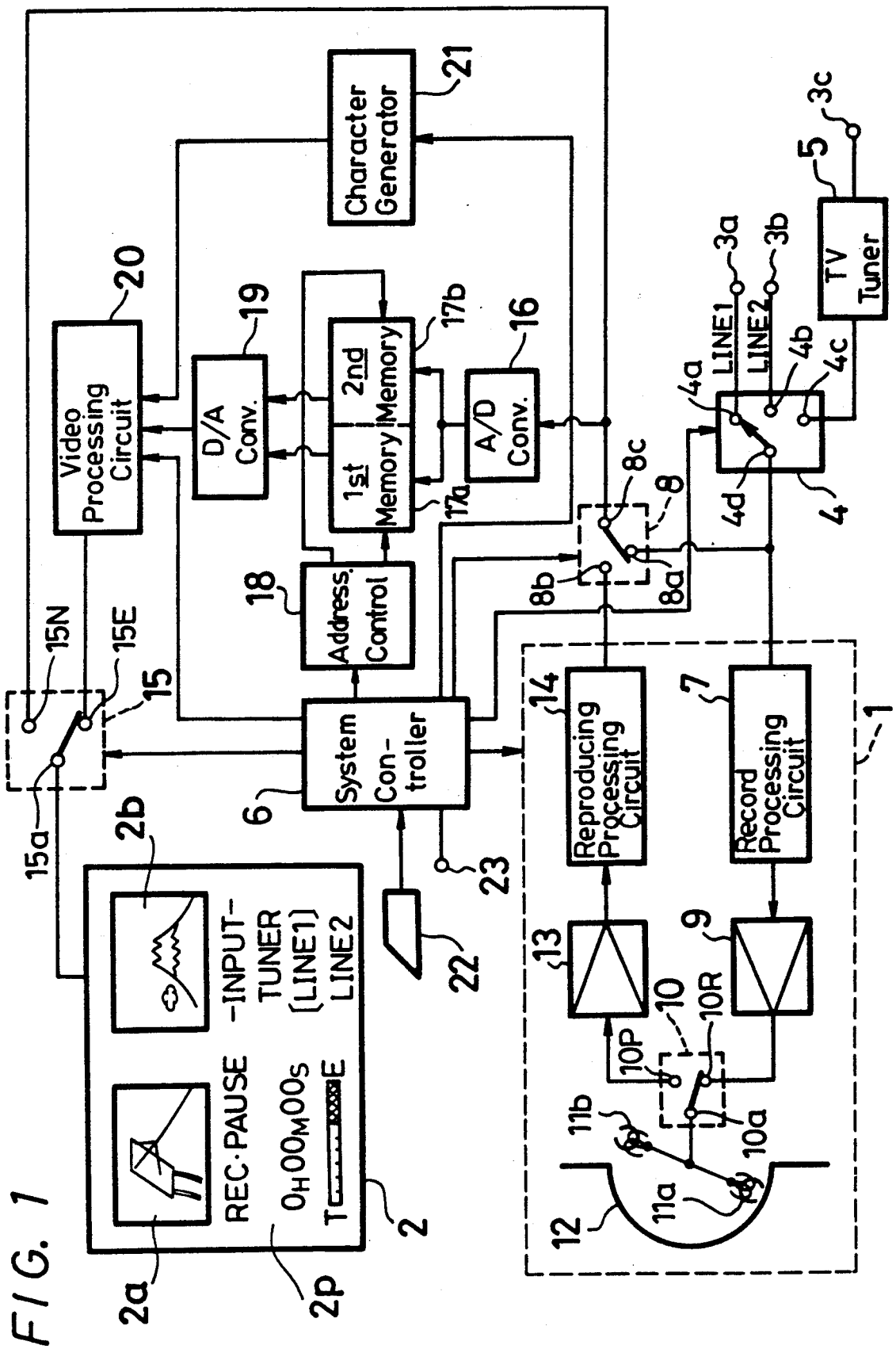
FIG. 1 is a block diagram showing a video tape recorder having a picture-in-picture function according to an embodiment of the present invention.

As shown on FIG. 1, the VTR 1 is associated with a television monitor receiver 2 and is provided with first and second input terminals 3a and 3b to which video signals from other video tape recorders and the like (not shown) are supplied. The first and second input terminals 3a and 3b are connected to first and second fixed contacts 4a and 4b, respectively, of a change-over switch 4. Further, there is provided an input terminal 3c to which is supplied a television broadcast signal from a television antenna (not shown). The television broadcast signal input terminal 3c is connected to a third fixed contact 4c of the change-over switch 4 through a television tuner 5. The change-over switch 4 is controlled by a command signal from a system controller 6 to connect its movable contact 4d with any selected one of the fixed contacts 4a, 4b and 4c. The system controller 6 may be constituted by a microcomputer. The movable contact 4d of the change-over switch 4 is connected to the input of a recording processing circuit 7 in the recording and reproducing apparatus or VTR 1. The movable contact 4d of the change-over switch 4 is also connected to a fixed contact 8a of a change-over switch 8.

A signal to be recorded is supplied from the recording processing circuit 7 through a recording amplifier 9 to a recording-side fixed contact 10R of a record/playback change-over switch 10. A movable contact 10a of the record/playback change-over switch 10 is connected to rotary magnetic heads 11a and 11b which alternately scan slant tracks on a magnetic tape 12 that is to be edited. A playback-or reproducing-side fixed contact 10P of the record/playback change-over switch 10 is connected through a playback amplifier 13 to the input of a reproducing processing circuit 14. A reproduced video signal developed at the output of the reproducing processing circuit 14 is supplied to another fixed contact 8b of the change-over switch 8.

The recording and reproducing apparatus or VTR 1 is adapted to be selectively set in various operating modes, such as, a recording mode, a playback mode, a recording-pause mode, a playback-pause mode and the like, in response to respective control or command signals from the system controller 6. The movable contact 8c of the change-over switch 8 is connected to a normal-side fixed contact 15N of a change-over switch 15 and also to the input of an analog-to-digital (A/D) converter 16 that converts a video signal in analog form to a corresponding digital video signal. A digital video signal developed at the output of the A/D converter 16 is supplied to first and second memories 17a and 17b, respectively, that can each store video signals of one field or one frame for forming two sub-pictures. The writing and reading of digital video data in the first and second memories 17a and 17b is controlled by an address controller 18 on the basis of command signals from the system controller 6.

When the recording and reproducing apparatus or VTR 1 is in its playback mode, the digital video signal from the A/D converter 16 is sequentially written only in the first memory 17a. When the VTR 1 is in its playback-pause mode or in its recording-pause mode, further writing in the first memory 17a is inhibited, but the video signal previously stored in the memory 17a can be repeatedly read to provide a respective still picture. When the VTR 1 is in its recording-pause mode, the digital video signal from the A/D converter 16 is sequentially written in the second memory 17b. Finally, when the VTR 1 is in its recording mode, successive fields or frames of the digital video signal from the A/D converter 16 are alternately written in the first and second memories 17a and 17b.

Upon editing, the video signals are read out of both the first and second memories 17a and 17b. The video signals read out of the first and second memories 17a and 17b, respectively, are supplied through a digital-to-analog (D/A) converter 19 for conversion from digital video signals to analog video signals which are received by a video processing circuit 20. During editing, in response to commands from the system controller 6, the address controller 18 controls the timing of the writing and reading of the memories 17a and 17b in such a manner that the video signal written or stored in the memory 17a is displayed as a sub-picture 2a at a left-hand portion or area of a picture screen 2p of the television monitor receiver 2, while the video signal written or stored in the memory 17b is displayed as a sub-picture 2b at a right-hand portion or area of the picture screen 2p.

Further, a character generator 21 is controlled on the basis of information signals derived from the system controller 6 to provide corresponding character signals which are supplied to the video processing circuit 20. Then, the video signals read out from one or both of the first and second memories 17a and 17b are mixed by the video processing circuit 20 with the character signals from the generator 21. Thus, the television monitor receiver 2 also displays on its picture screen 2p suitable characters providing indications of the present mode of the recording and reproducing apparatus or VTR 1, such as, PB for the playback mode, PB. PAUSE for the playback-pause mode, REC for the recording mode, and REC.PAUSE for the recording-pause mode (as shown). Further, the character generator 21 provides additional character signals which indicate, on the screen 2p, the present address along the tape as determined by a CTL counter (not shown), the remaining volume of the magnetic tape 12, the source or type of video signal being presently input to the VTR in accordance with the switched condition of the change-over switch 4, and the like.

The output video signal from the video processing circuit 20 is supplied to an editing-side fixed contact 15E of the change-over switch 15 which responds to a command signal from the system controller 6 to connect its movable contact 15a to one or the other of the fixed contacts 15N and 15E. Upon editing, the change-over switch 15 connects its movable contact 15a to the editing-side fixed contact 15E, whereas, in all other cases, the movable contact 15a is connected to the normal-side fixed contact 15N. The video signal developed at the movable contact 15a of the change-over switch 15 is supplied to an input of the television monitor receiver 2.

In FIG. 1, a key apparatus or keyboard 22 is shown for actuation by the user so as to issue various commands to the system controller 6. Finally, an address signal input terminal 23 is provided for the system controller 6 to receive the usual CTL count signal reproduced from the tape 12 in the VTR 1.

Figure 2C:
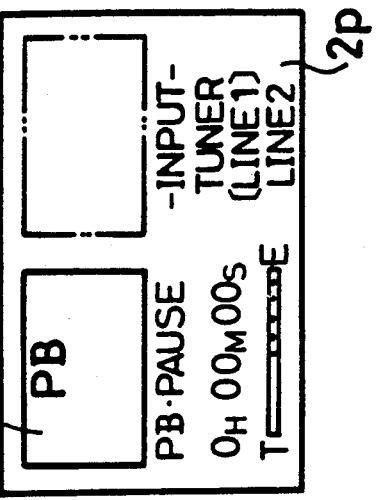
FIGS. 2A to 2F are schematic representations to which reference will be made in explaining the operation of the video tape recorder according to the present invention.
Figure 2B:
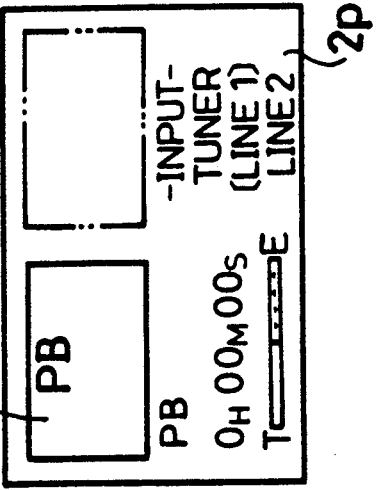
Figure 2A:
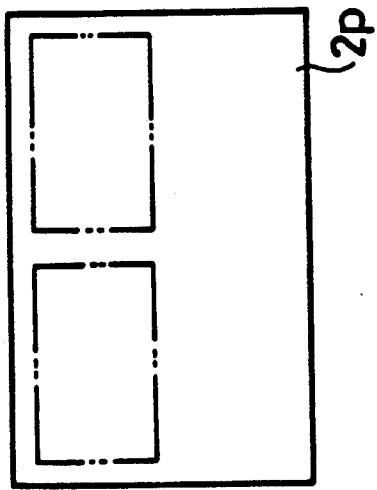

The operation of the above-described embodiment of the invention will now be further described with reference to FIGS. 2A–2F:

Initially, it will be assumed that, in an editing operation, a predetermined portion of the video signal previously recorded on the magnetic tape 12 is to be replaced by the input video signal from the first line input terminal 3a. For such editing operation, the keyboard 22 is suitably actuated so that the system controller 6 causes the change-over switch 15 to connect its movable contact 15a with the editing-side fixed contact 15E and the change-over switch 4 is made to connect its movable contact 4d with the first fixed contact 4a to which is supplied the input video signal from the first line input terminal 3a. For detecting the edit-in point on the magnetic tape 12, the playback mode is first established, that is, the record/playback change-over switch 10 is made to connect its movable contact 10a to the reproducing-side fixed contact 10P and the change-over switch 8 is made to connect its movable contact 8c to the fixed contact 8b. Accordingly, the video signal reproduced from the magnetic tape 12 by the rotary magnetic heads 11a and 11b is supplied through the reproducing amplifying circuit 13, the reproducing processing circuit 14, the change-over switch 8 and the A/D converter 16, and is sequentially written in the first memory 17a. Under the control of the system controller 6 and the address controller 18, the video signal written in the first memory 17a is read therefrom, and is supplied through the D/A converter 19 to the video processing circuit 20 by which the reproduced video signal from the magnetic tape 12 is made to be displayed as a real moving picture in the left-hand sub-picture portion 2a of the picture screen 2p, as shown in FIG. 2B. Further, the fact that the VTR 1 is in its playback mode is indicated by the display of the indicia PB on the screen 2p. When the user observes the desired edit-in point on the moving picture displayed at the left-hand sub-picture screen portion 2a, the VTR 1 is changed over to its playback-pause mode by suitably operating the keyboard 22. At that time, the video signal at the edit-in point is already written in the first memory 17a and further writing in the memory 17a is inhibited. Therefore, the video signal at the edit-in point is repeatedly read from the memory 17a so that, as shown in FIG. 2C, a still picture of the edit-in point is displayed at the left-hand sub-picture screen portion 2a, thus making it possible for the user to visually confirm the picture at the selected edit-in point.

Figure 2F:
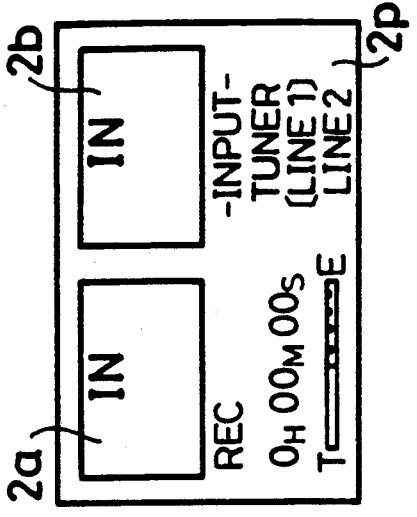
Figure 2E:
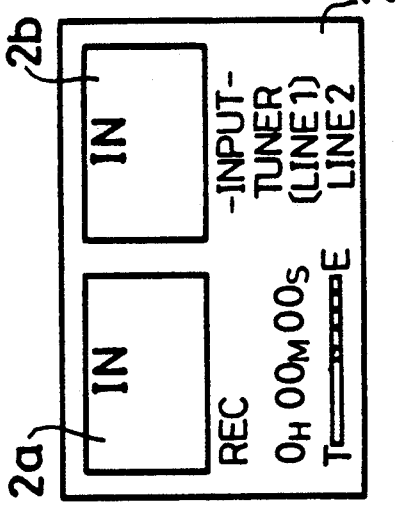
Figure 2D:
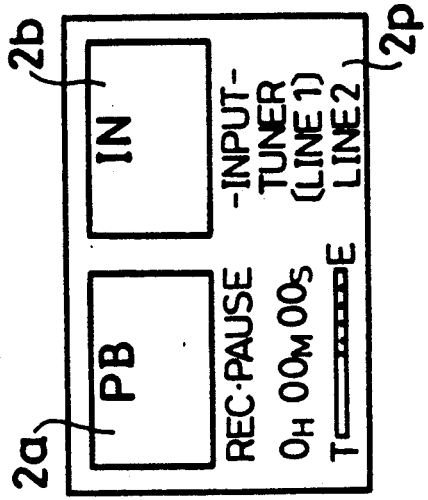

Then, the recording-pause mode of the VTR 1 is selected by suitably operating the key apparatus 22. At that time, the record/playback switch 10 continues to connect its movable contact 10a to the reproducing-side fixed contact 10P and the change-over switch 8 is made to connect its movable contact 8c to the fixed contact 8a. By reason of the foregoing, a still image of the edit-in point written or stored in the first memory 17a continues to be displayed at the left-hand sub-picture screen portion 2a of the picture screen 2p. Simultaneously, the input video signal from the first line input terminal 3a is converted by the A/D converter 16 to a digital video signal which is written in the second memory 17b. Such video signal is read out of the second memory 17b and supplied through the D/A converter 19 to the video processing circuit 20, so that the input video signal supplied to the first line input terminal 3a is displayed as a real moving picture at the right-hand sub-picture screen portion 2b of the picture screen 2p, as shown in FIG. 2D.

When a predetermined or desired picture corresponding to the input video signal supplied to the terminal 3a is observed at the right-hand sub-picture screen portion 2b of the television monitor receiver 2, the VTR 1 is released from the recording-pause mode and changed-over to its recording mode. In the recording mode, the switch 10 is made to engage its contact 10R and the switch 8 continues to engage its contact 8a so that the input video signal from the first line input terminal 3a is supplied through the recording processing circuit 7, the recording amplifier 9 and the change-over switch 10 to the rotary magnetic heads 11a and 11b. Consequently, the input video signal from terminal 3a is recorded on the magnetic tape 12 and is also supplied through the switch 8 and the A/D converter 16 to the first and second memories 17a and 17b, in which the input video signal from terminal 3a is alternately written at every frame of the input video signal. The video signals read out of the first and second memories 17a and 17b are supplied through the D/A converter 19 to the video processing circuit 20 with the result that, as shown in FIG. 2E, the input video signal supplied to the first line input terminal 3a, and which is being recorded on the tape 12, is displayed as real moving pictures at the two sub-picture screen portions 2a and 2b of the picture screen 2p in the television monitor receiver 2. When the recording and reproducing apparatus or VTR 1 is again changed-over to the recording-pause mode in order to halt the recording of the input video signal from the terminal 3a, the video signal occurring at the initiation of the recording-pause mode is stored in the first memory 17a so that a still image of such stored video signal is reproduced at the left-hand sub-picture screen portion 2a of the television monitor receiver 2, while a real moving picture corresponding to the input video signal supplied to the first line input terminal 3a is displayed at the right-hand sub-picture screen portion 2b.

It will be appreciated that, in the embodiment of the invention described above, when a moving picture is displayed at the left-hand sub-picture screen portion 2a, such moving picture is a reproduced image corresponding to the video signal being recorded on the magnetic tape 12, whereas, when a still picture is displayed at the left-hand sub-picture screen portion 2a, the recording is stopped so that it can be visually confirmed whether or not the VTR 1 is in its recording mode. Further, the content of the video signal being recorded can be visually confirmed. Therefore, mis-operation during editing can be avoided and each operation involved in editing can be easily controlled an effected.

Further, in the above described embodiment, indicia representing the mode of the recording and reproducing apparatus or VTR 1, the remaining volume of the magnetic tape 12, the kind of the input video signals and the like are displayed on the picture screen 2p for further assisting the user in avoiding errors in the editing operation.

Figure 3:
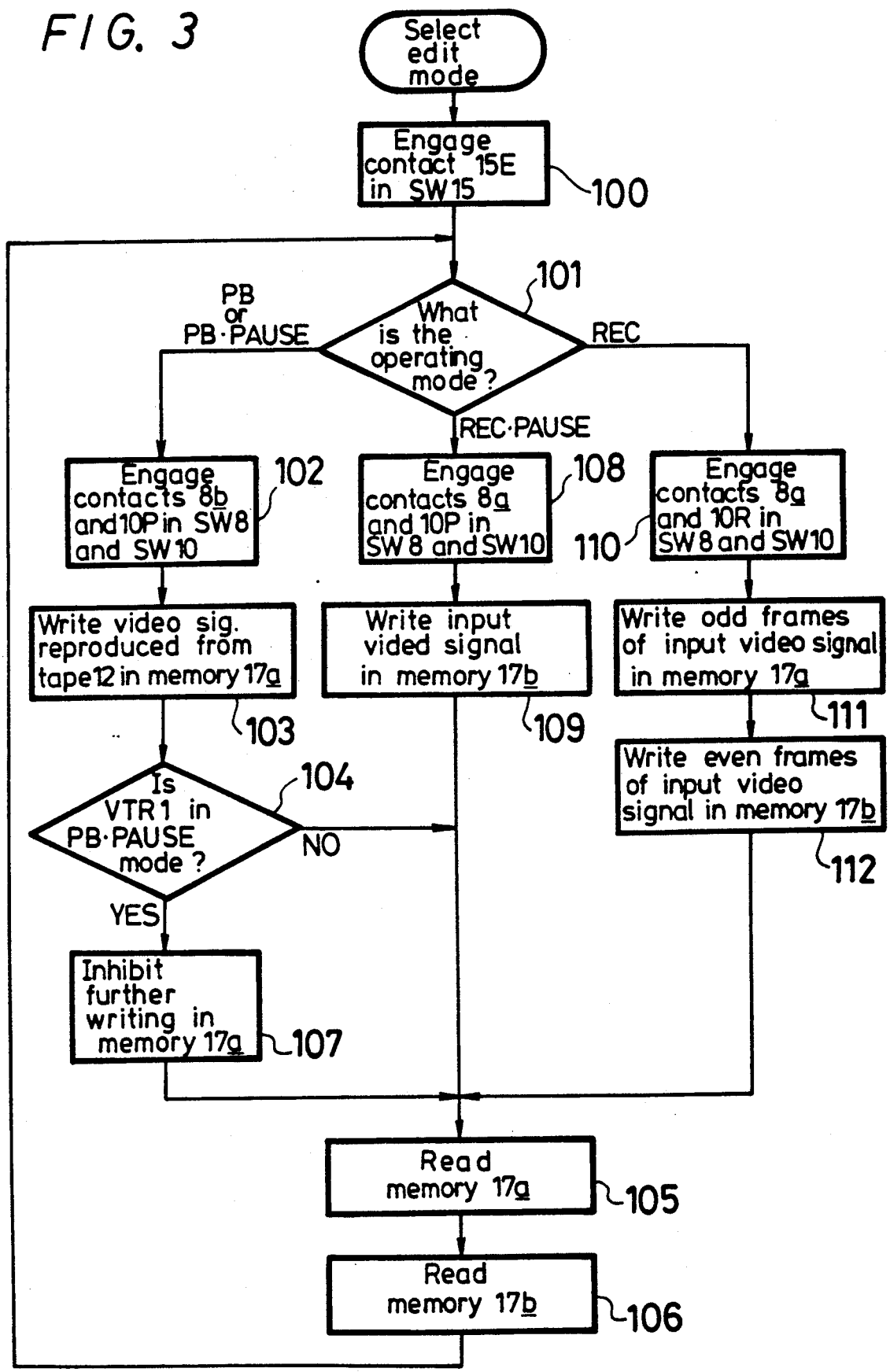
FIG. 3 is a flow chart to which reference will be made in explaining the operation of the video tape recorder according to the invention in an editing mode.

The editing operation of the VTR 1 embodying this invention will be further described with reference to FIG. 3, which shows a flow chart of the program performed by the system controller 6 in the editing mode of the apparatus.

When the editing mode is selected by actuation of the keyboard 22, the movable contact 15a of the switch 15 is engaged with the editing-side fixed contact 15E in response to a command from the system controller 6 in the step 100 and this status is maintained so long as the apparatus is in its editing mode. The input video signal which is to be recorded is selected at the switch 4 in response to the user's actuation of the keyboard 22.

With the apparatus in the editing mode, the system controller 6 judges in the step 101, the operation mode of the VTR 1 such as, the playback mode, the playback-pause mode, the recording-pause mode or the recording mode. When the VTR 1 is judged to be in the playback mode or the playback-pause mode, the fixed contacts 8b and 10P are engaged at the switches 8 and 10, respectively, in the step 102. Then the video signal being reproduced from the magnetic tape 12 is written in the memory 17a in the step 103. If the VTR 1 is in the playback mode, that is, if the response to the query, "Is the VTR 1 in the playback-pause mode?", in the step 104 is negative, the program proceeds to steps 105 and then step 106 in which the memories 17a and 17b are respectively read out. As the reproduced video signal is only written in the memory 17a, a moving picture corresponding to the reproduced video signal is displayed at the left-hand sub-picture screen portion 2a on the monitor 2, as shown in FIG. 2B.

When the playback-pause mode is selected, that fact is detected in step 104 and the routine proceeds to the step 107 in which further writing of the reproduced video signal in the memory 17a is inhibited. Thus, the reproduced video signal at the edit-in point is stored in the memory 17a and repeatedly read therefrom in step 105 so that a still picture of the reproduced video signal is displayed at the sub-picture screen portion 2a, as shown in FIG. 2C.

When the recording-pause mode is selected, this mode selection is detected in the decision step 101, and the program proceeds to the step 108 in which the fixed contacts 8a and 10p are selected at the switches 8 and 10, respectively. Then, the input video signal from a source previously selected at the switch 4 is written in the memory 17b in the step 109, and the memories 17a and 17b are read out in the steps 105 and 106, respectively. In this case, if the reproduced video signal has been previously stored in the memory 17a in the playback-pause mode, a still picture of the reproduced video signal from the edit-in point of the magnetic tape 12 and a moving picture of the input video signal are displayed at the sub-picture screen portions 2a and 2b, respectively, on the monitor 2, as shown in FIG. 2D.

When the recording mode is selected, this mode selection is detected at the decision step 101 and the fixed contacts 8a and 10R are selected at the switches 8 and 10, respectively, in the step 110. Then, alternate frames of the input video signal are written in the memories 17a and 17b, respectively, at the steps 111 and 112, and the memories 17a and 17b are read out at the steps 104 and 105, respectively. Thus, a moving picture of the input video signal is displayed at both sub-picture screen portions 2a and 2b on the monitor 2, as shown in FIG. 2E.

If the recording-pause mode is selected again after the recording mode, the routine again goes through the steps 101, 108, 109, 105 and 106. However, at this time, the input video signal stored in the memory 17a at the moment when the recording-pause mode is selected is displayed as a still picture in the screen portion 2a, and a moving picture of the present video input signal is displayed in the screen portion 2b, as shown in FIG. 2F.

Although the operation of the system controller 6 during the editing mode has been explained above, the order of the selection of the modes is not limited to the described order normally employed for editing. For example, the playback mode can be selected after the playback-pause mode.

When a standard or prerecorded tape is being reproduced without editing, the change-over switch 15 engages its movable contact 15a with the normal-side fixed contact 15N. In this state, in order to monitor the picture reproduced by the VTR 1 by means of the television monitor receiver 2, the recording/playback switch 10 engages its movable contact 10a with the reproducing-side fixed contact 10P, and the change-over switch 8 engages its movable contact 8c with the fixed contact 8b. Thus, the video signal reproduced by the rotary magnetic heads 11a and 11b is supplied through the playback amplifying circuit 13 and the reproducing processing circuit 14 to the television monitor receiver 2, and a picture corresponding to this video signal is displayed on the picture screen 2p. In order to reproduce the incoming video signals supplied to the first and second line input terminals 3a and 3b or the television broadcast signal supplied to the input terminal 3c, the change-over switch 8 is made to engage its movable contact 8c with the fixed contact 8a and the change-over switch 4 is made to engage its movable contact 4d with a selected one of the fixed contacts 4a, 4b and 4c, for supplying a desired incoming video signal to the television monitor receiver 2 so as to be displayed thereby. Further, in this normal mode, if the movable contact 10a of the recording and reproducing change-over switch 10 is engaged with the recording-side fixed contact 10R and the VTR 1 is set in the recording mode, the input video signal selected at the switch 4 can be recorded.

According to the present invention, as set out above, the editing being effected can be visually confirmed and the editing operations can be easily performed. Further, such advantages of the present invention are realized even when applied to a home video tape recorder.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A video tape recorder capable of producing sub-picture of video signals to be edited, comprising:
   means for reproducing video signals recorded on a tape;
   means for recording video signals on said tape;
   video signal input means for receiving input video signals and supplying the input video signals to said recording means;
   switch means for selecting video signals from said reproducing means and said video signal input means, respectively;
   analog-to-digital converter means for converting video signals selected by said switch means to digital video signals;
   first and second memory means each capable of storing a predetermined quantity of said digital video signals selected from a field and a frame thereof;
   digital-to-analog converter means for converting signals read from each of said first and second memory means to analog video signals;
   monitor means having a screen;
   address control means for controlling writing and reading addresses of said memory means so as to read from said memory means sub-picture signals which are to be supplied to said monitor means for display on said screen;
   key means actuable for establishing an editing mode of said video tape recorder and for selecting an operation mode of said video tape recorder from among playback, playback-pause, recording and recording-pause modes thereof; and system control means for controlling said reproducing means, said recording means, said switch means and said address control means, said system control means being programmed as follows;

with said video tape recorder in said editing mode, a) When said key means is actuated to selected one of said playback and playback-pause modes, said switch means selects video signals from said video signal reproducing means, and said address control means causes reproduced video signals from said tape to be written in said first memory means and then read from said first memory means so that said sub-picture signals correspond to said reproduced video signals;

b) When said key means is actuated to selected said recording-pause mode, said switch means selects the video signals from said video signal input means, and said address control means causes said video signals from said video signal input means to be written in said second memory means and then read from said second memory means so that said sub-picture signals correspond to said video signals from said input means; and c) When said key means is actuated to select said recording mode, said switch means selects the video signals from said video signal input means, and said address control means causes said video signals from said video signal input means to be written alternately in one of said first and second memory means and then causes reading from said first and second memory means so that sub-picture signals corresponding to said video signals from said input means are obtained from said first and second memory means, respectively.

2. A video tape recorder according to claim 1; in which said system control means controls the timing of the reading and writing of said first and second memory means by said address control means so that pictures of sub-picture signals obtained from said first memory means and pictures of sub-picture signals obtained from said second memory means are displayed on respective first and second portions of said screen of the monitor means.

3. A video tape recorder according to claim 1; further comprising character generator means for generating mode display signals corresponding to said modes of said video tape recorder, and means for superimposing said mode display signals on said analog video signals from said digital-to-analog converter means, said character generator means and said means for superimposing being controlled by said system control means.

4. A video tape recorder according to claim 3; further comprising output switch means for selectively supplying one of said analog video signals from said digital-to-analog converter means and said video signal selected by the switch means, said output switch means being controlled by said system control means to select said analog video signals from said digital-to-analog converter means when said editing mode is selected by said key means.

5. A video tape recorder according to claim 1; in which said video signal input means includes input switch means for selecting said input video signals from among a plurality of sources thereof.

6. A video tape recorder according to claim 1; in which, when said playback-pause mode is selected, further writing of said reproduced video signals from said tape in said first memory means is inhibited, so that said sub-picture signals correspond to a still picture of the video signal being reproduced from the tape at the moment of the selection of said playback-pause mode.

* * * * *